United States Patent
York

(10) Patent No.: US 10,467,019 B2
(45) Date of Patent: Nov. 5, 2019

(54) SERVING IMAGES TO SERVER GROUPS

(71) Applicant: HEWLETT PACKARD ENTERPRISE DEVELOPMENT LP, Houston, TX (US)

(72) Inventor: Justin E. York, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 199 days.

(21) Appl. No.: 15/821,043

(22) Filed: Nov. 22, 2017

(65) Prior Publication Data
US 2019/0155614 A1 May 23, 2019

(51) Int. Cl.
| | |
|---|---|
| *G06F 9/4401* | (2018.01) |
| *H04L 12/24* | (2006.01) |
| *G06F 8/61* | (2018.01) |
| *H04L 29/08* | (2006.01) |
| *G06F 8/60* | (2018.01) |

(52) U.S. Cl.
CPC ............ *G06F 9/4416* (2013.01); *G06F 8/63* (2013.01); *H04L 41/5054* (2013.01); *H04L 67/06* (2013.01); *H04L 67/34* (2013.01); *G06F 8/60* (2013.01); *G06F 9/4401* (2013.01); *G06F 9/4406* (2013.01); *H04L 41/5025* (2013.01); *H04L 67/1008* (2013.01); *H04L 67/12* (2013.01)

(58) Field of Classification Search
CPC .... G06F 9/4401; G06F 9/4406; G06F 9/4416; G06F 8/63; G06F 8/60; H04L 41/5054; H04L 67/06; H04L 67/34; H04L 41/5025; H04L 67/1008; H04L 67/12

USPC ................... 713/1, 2; 717/172, 177
See application file for complete search history.

(56) References Cited

U.S. PATENT DOCUMENTS

| | | | |
|---|---|---|---|
| 6,178,529 B1 * | 1/2001 | Short | G06F 11/2038 709/223 |
| 7,194,619 B2 * | 3/2007 | Abbondanzio | G06F 21/305 709/222 |
| 7,788,713 B2 | 8/2010 | Grobman et al. | |
| 8,331,366 B2 | 12/2012 | Chang et al. | |
| 8,930,685 B2 | 1/2015 | Fontignie et al. | |
| 9,130,912 B2 | 9/2015 | Agrawal et al. | |
| 9,654,599 B1 * | 5/2017 | Wheeler | H04L 67/34 |

(Continued)

OTHER PUBLICATIONS

CVP, "Secure Cloud Ubiquitous Computing—Deliver Anywhere, Anytime, Any Channel," 2017, pp. 1-3 [online], Retrieved from the Internet on Aug. 16, 2017 at URL: <www.cvpcorp.com/what-we-do/secure-cloud/>.

*Primary Examiner* — Ji H Bae
(74) *Attorney, Agent, or Firm* — Hewlett Packard Enterprise Patent Department

(57) ABSTRACT

Example implementations relate to serving an image to a group of target servers. An example implementation includes assigning a first target server of a group of target servers as a temporary deployment server. The first target server may be assigned as a temporary deployment server by a master deployment server over a management network. The master deployment server may serve the first target server an image package. The master deployment server may further serve a command over the management network to a second target server of the group of target servers. The second target server may be commanded to retrieve, over a data network, a deployment image of the image to be booted on the second target server.

20 Claims, 9 Drawing Sheets

(56) References Cited

U.S. PATENT DOCUMENTS

| | | | | |
|---|---|---|---|---|
| 2006/0242400 | A1* | 10/2006 | Anderson | G06F 9/4405 713/2 |
| 2007/0157016 | A1* | 7/2007 | Dayan | G06F 9/4416 713/2 |
| 2008/0046708 | A1* | 2/2008 | Fitzgerald | G06F 8/63 713/2 |
| 2010/0174810 | A1* | 7/2010 | Cain | G06F 9/4416 709/222 |
| 2012/0005472 | A1* | 1/2012 | Nagai | G06F 8/63 713/2 |
| 2013/0019239 | A1* | 1/2013 | Fontignie | G06F 8/61 717/178 |

* cited by examiner

SERVING IMAGES TO SERVER GROUPS

BACKGROUND

Cloud-based computing architectures enable delivery of computing as a service, whereby a shared pool of configurable computing resources may be provided as a service and provisioned to meet customers changing needs. The resources may be located remotely or locally, and may be shared over a network, e.g. the internet. Cloud computing may facilitate services such as Infrastructure-as-a-Service (IaaS), Platform-as-a-Service (PaaS), Software-as-a-Service (SaaS), etc.

Depending on user demand, a cloud service provider may provide any of the aforementioned services, and these services may take the form of provisioned resources on a cloud. For example, a workload may be launched at the request of a user, and a cloud service provider may responsively provision infrastructure resources, e.g. a virtual machine hosting an operating system volume, platform resources, etc., to accommodate the workload.

BRIEF DESCRIPTION OF THE DRAWINGS

Certain examples are described in the following detailed description and in reference to the drawings, in which.

DETAILED DESCRIPTION OF SPECIFIC EXAMPLES

An operating system (OS) image may be deployed on any number of target servers, i.e. servers on which an OS image is to be deployed. An OS image may be a particular state of an OS deployed or to be deployed on a hardware component of a server and an OS image may be deployed to a target server such that the target server boots and runs from the OS image.

Deploying OS images to a group of servers may be achieved through utilization of a master deployment server. A master deployment server may serve an OS image to servers over a management network. However, deploying an OS image to a multitude of target servers over a management network may take considerable time. The speed at which an OS image is deployed may be limited by the speed of the network, the resources of the master deployment server for sending the OS image, the resources of the target servers for receiving the OS image, a combination thereof, and/or other factors related to image deployment. Where an OS image is deployed to many target servers, the limitations of the management network and master deployment server resources for sending the OS image may become considerable bottlenecks for efficient OS image deployment.

Figure 1:
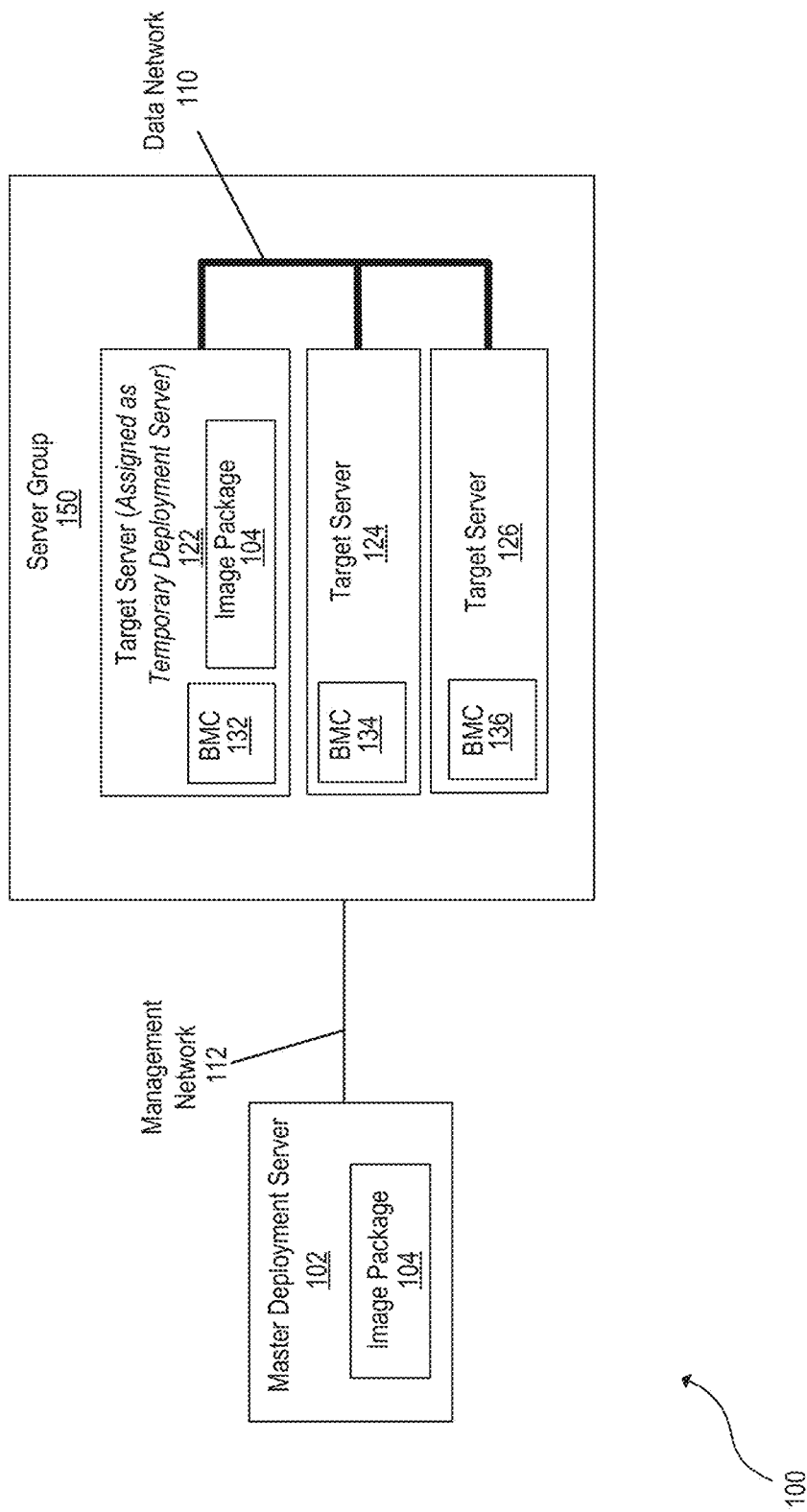
FIG. 1 is a block diagram of an example system for serving a deployment image to a server group.

A data network of a group of servers may be utilized for efficient deployment of an OS image to the server group. FIG. 1 is a block diagram illustrating an example system 100 for serving an OS image to a target server of server group 150. System 100 may include a master deployment server 102 for serving an OS image. Master deployment server 102 may be implemented as hardware or a combination of hardware and software/firmware for managing server group 150. Master deployment server 102 may host an image package 104 including any number of OS images to be served to server group 150.

Figure 2:
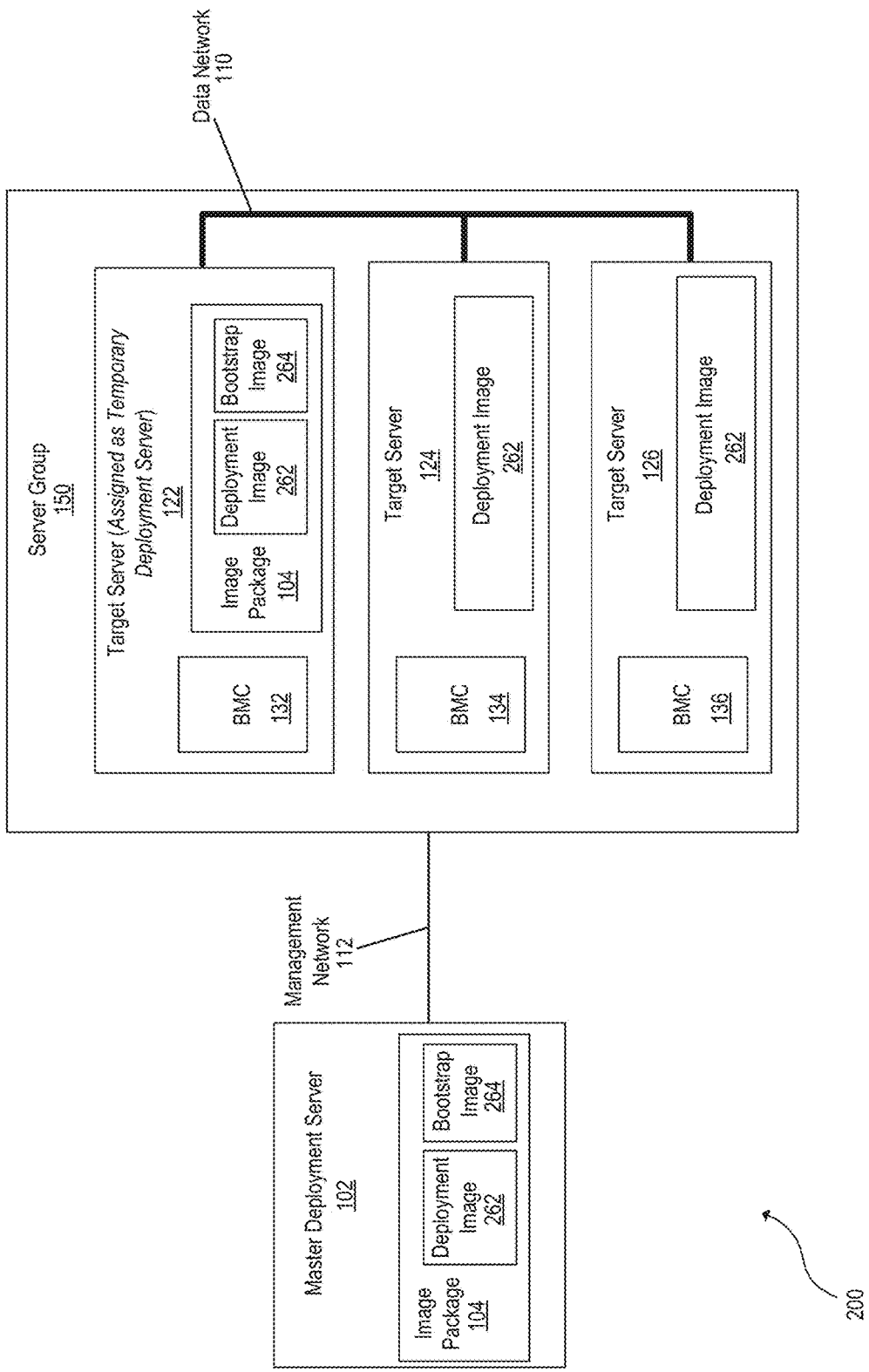
FIG. 2 is a block diagram of an example system for serving a deployment image to a server group.

In some implementations, image package 104 may include an image that functions as a deployment image on a target server assigned as a temporary deployment server, and as a bootstrap image on a target server not assigned as a temporary deployment server, as will be described in greater detail below. In some implementations, image package 104 may include both a deployment image 262, as shown in FIG. 2 of system 200, to be deployed on a server, and a bootstrap image 264, as shown in FIG. 2 of system 200, that, responsive to being booted on a target server, serves images from the target server. Bootstrap image 264 may be booted on a temporary deployment server such that the temporary deployment server may serve an image of image package 104 to a different target server of the server group 150.

Image package 104, or a deployment image 262 of image package 104 as shown in FIG. 2, may be served to target servers of server group 150 to be booted thereon. In some implementations, server group 150 may be a group of servers that together form resources for a cloud service. FIG. 1 illustrates three example target servers, servers 122-126 respectively, as a server group 150 to receive the deployment image. However, any number of servers may form server group 150.

Example target servers 122-126 of server group 150 may be in communication over a data network 110 such that target servers 122-126 may share resources, collectively support workloads and/or application services, etc. Data network 110 may be a fast data network enabling high data transfer rates to support efficient sharing of resources between target servers of server group 150.

Data network 110 may, in some examples, be a secure network isolated from other networks. Data network 110 may, for example, be isolated from management network 112. Management network 112 may be a low-performance special purpose network having limited permissions. Specifically, management network 112 may be a lower bandwidth network than data network 110 and may support fewer input/output operations per second (IOPS) relative to data network 110.

Management network 112 may have limited permissions such that master deployment server 102 may have limited access to data stored on target servers 122-126. Examples of limited permissions may include some or all of the following: permissions to power a target server on or off; permissions to verify if a server is powered on or off; permissions to check the health and status of a server; permissions to assign a target server as a temporary deployment server or remove the assignment of a target server as a temporary deployment server; permissions to serve an image to a target server; permissions to boot an image on a target server; permissions to provide information to a target server, e.g. trust certificates, a location of a target server, the status of other target servers of server group 150, etc.

In some implementations, the master deployment server 102 may implement any of the above listed permissions on a target server through a baseboard management controller (BMC) of the target server, e.g. BMC 132 of target server 122, BMC 134 of target server 124, or BMC 136 of target server 126. A BMC of a target server may be embedded in the server, e.g. on a motherboard of the server. The BMC may interface between hardware of the target server and system management software, and may communicate monitored data of the server. For instance, hardware sensors of the server (not shown) may monitor the health, operating system (OS) status, power status, etc., of the server and report monitored data to the BMC of the server. Master deployment server 102 may be in communication with the BMC of a server via management network 112, and thus may have access to monitored data reported to a BMC.

Master deployment server 102 may assign a target server as a temporary deployment server, and/or remove the assignment of a target server as a temporary deployment server. In the example illustrated in FIG. 1, target server 122 is assigned as a temporary deployment server, while target server 124 and target server 126 are not assigned as temporary deployment servers. In some implementations, as described further herein, images deployed on a target server may enact different functions depending on whether the target server is assigned as a temporary deployment server or not. Master deployment server 102 may, for example, send a signal to a target server, i.e. through the BMC of the target server, to enact bootstrap image functionality or deployment image functionality depending on whether or not the target server is assigned as a temporary deployment server.

Policies may be implemented such that master deployment server 102 treats a target server assigned as a temporary deployment server differently than a target server not assigned as a temporary deployment server. For example, master deployment server 102 may serve image package 104 to any target server assigned as a temporary deployment server. Conversely, in some implementations, master deployment server 102 may not serve image package 104 to any target server not assigned as a temporary deployment server. As illustrated in FIG. 1, target server 122 is assigned as a temporary deployment server 122 and is served image package 104 from master deployment server 102 over management network 112—and in some implementations, through BMC 154. In this example, target servers 124 and 126 are not assigned as temporary deployment servers and are therefore not served image package 104 over management network 112.

A master deployment server may transmit a command to target servers not assigned as temporary deployment servers to retrieve an image from a target server assigned as a temporary deployment server. FIG. 2 is a block diagram illustrating an example system 200 for booting a deployment image on a group of target servers. System 200 may include similar architecture to that of system 100. For clarity and conciseness, some of the components of system 200 may be described with reference to system 100 of FIG. 1, including master deployment server 102 hosting image package 104, data network 110, management network 112, server group 150 including target server 122 having BMC 132, target server 124 having BMC 134, and target server 126 having BMC 136.

Master deployment server 102 may transmit a command to any of target servers 124 and 126 to retrieve image package 104 from temporary deployment server 122. In another example, master deployment server 102 may transmit a command to any of target servers 124 and 126 to retrieve deployment image 262 of image package 104 from temporary deployment server 122. FIG. 2 illustrates target server 124 and target server 126 having retrieved deployment image 262 of image package 104 from target server 122. Responsive to target servers 124 and 126 having retrieved image package 104 from temporary deployment server 122, or a deployment image of image package 104 from temporary deployment server 122, master deployment server 102 may transmit a command to target servers 124 and 126 to boot a retrieved image. In other implementations, a retrieved image may automatically boot on a target server on which it is received. Thus, a target server may be assigned as a temporary deployment server to serve deployment images to a plurality of targets servers over a data network.

Master deployment server 102 may remove the assignment of target server 122 as a temporary deployment server. In some examples, master deployment server 102 may monitor target servers 124 and 126 through management network 112, and specifically through BMC 134 of target server 124 and BMC 136 of target server 126. Responsive to target server 124 and target server 126 having retrieved the image, master deployment server 102 may remove the assignment of target server 122 as a temporary deployment server. As another example, master deployment server 102 may monitor target server 122 through management network 112, and specifically through BMC 132 of target server 122. Responsive to target server 122 deploying image package 104 or a deployment image of image package 104 to a threshold number of target servers or a threshold percentage of target servers, master deployment server 102 may remove the assignment of target server 122 as a temporary deployment server.

Like target servers 124 and 126, target server 122 may be booted with the image retrieved by target servers 124 and 126. In some examples, master deployment server 102 may transmit a command to target server 122 to boot the image retrieved by target servers 124 and 126 responsive to removing the assignment of target server 122 as a temporary deployment server. In some examples, a deployment image of image package 104 may automatically boot on target server 122 responsive to the removal of the assignment of target server 122 as a temporary deployment server.

Figure 3:
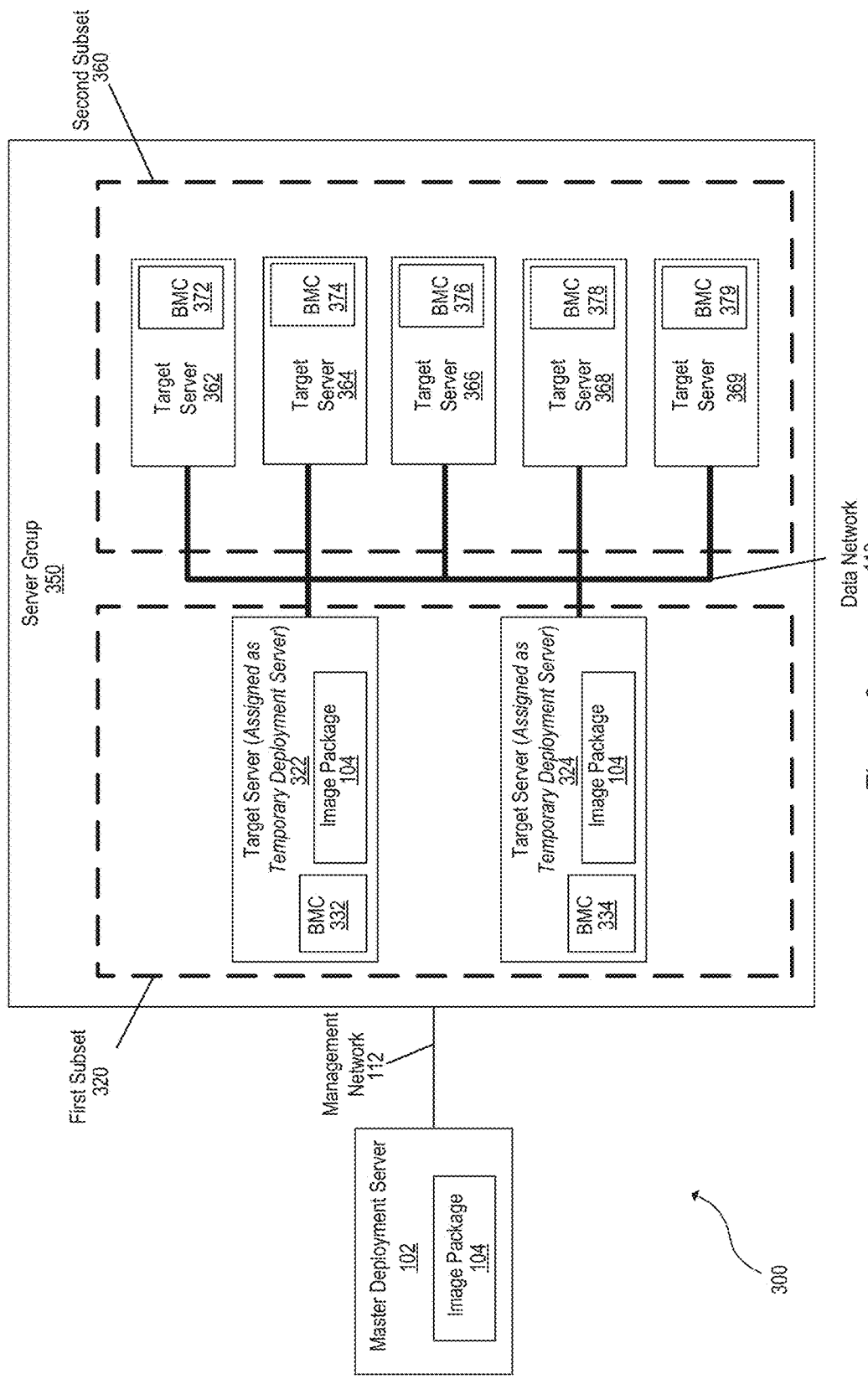
FIG. 3 is a block diagram of an example system for serving a deployment image to a server group utilizing a plurality of temporary deployment servers.

A master deployment server may assign any number of target servers of a server group as temporary deployment servers. FIG. 3 is a block diagram illustrating an example system 300 for booting a deployment image on a group of target servers via a plurality of temporary deployment servers. System 300 may include similar architecture to that of system 100. For clarity and conciseness, some of the components of system 300 may be described with reference to system 100 of FIG. 1, including master deployment server 102 hosting image package 104, data network 110, and management network 112. Master deployment server 102 may be in communication with server group 350 over management network 112. Server group 350 may include any number of target servers, including target server 322 having BMC 332 and target server 324 having BMC 334, as well as target servers 362-369 having BMCs 372-379 respectively.

As described above, master deployment server 102 may assign a target server as a temporary deployment server, and/or remove the assignment of a target server as a temporary deployment server. Master deployment server 102 may assign any number of target servers as temporary deployment servers for serving image package 104 or a deployment image of image package 104. The target server selected to be assigned as a temporary deployment server from server group 350 may be selected randomly, by round-robin, according to available resources of a target server, according to target server latency, a combination thereof, and/or through any other selection process. In an example, master deployment server 102 may assign a first target server as a temporary deployment server, and, responsive to a failure to meet a performance threshold, may assign a second target server as a temporary deployment server.

In some examples, the performance threshold may not be met where a time of deployment is too great, or the management network or data network reaches a predetermined network congestion. For instance, the performance threshold may not be met where a component of the temporary deployment server, such as a storage controller disk of the temporary deployment server, experiences too great a rate of input/output (I/O) transfers per second. In some examples, the performance threshold may not be met where there is too great a ratio of target servers to temporary deployment servers.

As illustrated in FIG. 3, an example first subset 320 of target servers may be assigned as temporary deployment servers. In this example, two target servers, target server 322 having BMC 332, and target server 324 having BMC 334 respectively, are assigned as temporary deployment servers. Target server 322 and target server 324 are further served image package 104 over management network 112. Two example target servers of server group 350 are assigned as temporary deployment servers. However, any number of target servers may be assigned as temporary deployment servers and server group 350 may include any number of servers to be served image package 104. In an example, the example target servers in first subset 320 of server group 350 may be assigned as temporary deployment servers due to the large number of target servers of server group 350, and/or in order to otherwise meet a performance threshold as described above.

In some implementations, master deployment server 102 serves image package 104 to the assigned temporary deployment servers over management network 112, which includes both temporary deployment server 322 and temporary deployment server 324 in the case illustrated in FIG. 3. In some implementations, master deployment server 102 may assign target server 322 as a temporary deployment server, and serve image package 104 to target server 322 over management network 112. Responsive to a failure to meet a performance threshold, master deployment server 102 may then assign target server 324 as a temporary deployment server over management network 112, and may serve a command to target server 324 to receive image package 104 from target server 322 over data network 110.

Master deployment server 102 may transmit a command to any of target servers 362-369 of second subset 360 to retrieve image package 104 from temporary deployment server 322 or temporary deployment server 324. In an example, master deployment server 102 may transmit a command to select target servers of second subset 360 to retrieve a deployment image of image package 104 from target server 322 and to select target servers of second subset 360 to retrieve the deployment image of image package 104 from target server 324. For instance, master deployment server 102 may issue trust certificates, and/or IP addresses of temporary deployment servers to target servers of second subset 360. Each trust certificate or IP address delivered to a target server of second subset 360 may correspond to a target server of first subset 320, such that a target server of second subset 360 retrieves the deployment image of image package 104 from a temporary deployment server that corresponds to the target server's received IP address and/or trust certificate.

In another example, master deployment server 102 may transmit a command to the target servers of second subset 360 to retrieve a deployment image of image package 104 from either target server 322, or target server 324. For instance, a target server of second subset 360 may retrieve the deployment image of image package 104 from whichever temporary deployment server of first subset 320 that first serves image package 104 to the target server. In this example, trust certificates of each of the temporary deployment servers, and/or IP addresses of each of the temporary deployment servers, may be served by master deployment server 102 to the target servers of second subset 360. Accordingly, a plurality of temporary deployment servers may be employed to serve image package 104 and/or a deployment image of image package 104 to a server group.

Figure 4:
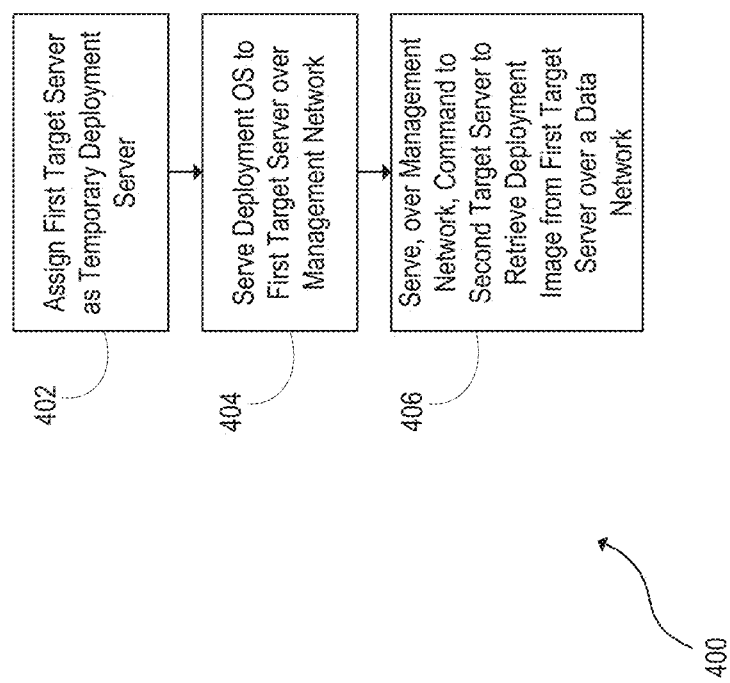
FIG. 4 is a flowchart depicting an example method for serving a deployment image to a server group.

FIG. 4 is a flowchart illustrating a method 400 for serving a deployment image to a server group. Although execution of method 400 is described below with reference to system 100 and system 200, other suitable components for execution of method 400 may be utilized. Additionally, the components for executing method 400 may spread among multiple devices. Method 400 may be implemented in the form of executable instructions stored on a machine-readable storage medium and/or in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, a first target server of a group of target servers may be assigned as a temporary deployment server. For example, first target server 122 may be assigned as a temporary deployment server over management network 112 by master deployment server 102. The group of target servers, e.g. server group 150, may be in communication over data network 110 and may be a group of target servers on which a deployment image is to be deployed.

At block 404, a deployment operating system (OS) image may be served to the temporary deployment server. For instance, image package 104 may include a deployment image and may be hosted on master deployment server 102. An image of image package 104 may be served to temporary deployment server 122 over management network 112, and, in some examples, may be served to BMC 132 of temporary deployment server 122. An image of image package 104 may be served to temporary deployment server 122 over management network 112, and, in some examples, may be served to BMC 132 of target server 122.

In some examples, image package 104—as served to temporary deployment server 122—may include deployment image (e.g., similar to deployment image 262 of FIG. 2) and/or bootstrap image (e.g., similar to bootstrap image 264 of FIG. 2). A deployment image may be an image to be booted on the group of target servers. A bootstrap image, running on the temporary deployment server 122, may serve deployment images to target server 124 and target server 126 of server group 150. Thus, a first target server assigned as a temporary deployment server may be served a bootstrap image for serving a deployment image to a second target server of the group of target servers.

At block 406, a command may be served to a second target server to retrieve the deployment image from a first target server. The command may be served by master deployment server 102 over management network 112. The command may, for example, be served to target server 124 and target server 126 through BMC 134 and BMC 136 respectively. The command may instruct target server 124 or target server 126 to retrieve deployment image 262 from target server 122 over data network 110. Data network 110 may be a greater bandwidth network than management network 112, and may be isolated from management network 112 for system security.

Figure 5:
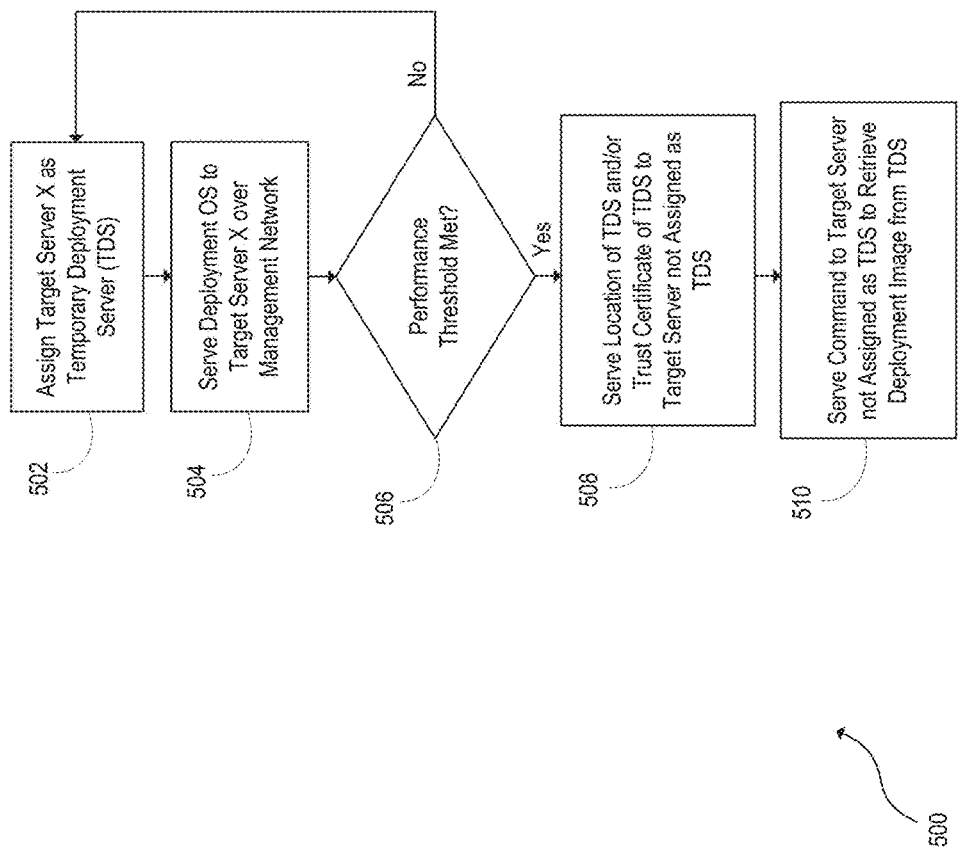
FIG. 5 is a flowchart depicting an example method for serving a deployment image to a server group.

FIG. 5 is a flowchart illustrating a method 500 for serving a deployment image to a server group. Although execution of method 500 is described below with reference to system 300, other suitable components for execution of method 500 may be utilized. Additionally, the components for executing method 500 may spread among multiple devices. Method 500 may be implemented in the form of executable instructions stored on a machine-readable storage medium and/or in the form of electronic circuitry, e.g. hardware. In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, a target server may be assigned as a temporary deployment server. For example, target server 322 illustrated in FIG. 3 may be assigned as a temporary deployment server over management network 112 by master deployment server 102. A group of target servers, e.g. server group 350, may be in communication over data network 110 and may be a group of target servers on which a deployment image is to be deployed.

At block 504, image package 104 may be served to temporary deployment server 322. For instance, image package 104 may be hosted on master deployment server 102. Image package 104 may be served to temporary deployment server 322 over management network 112, and, in some examples, may be served to BMC 332 of temporary deployment server 322.

At block 506, it may be determined whether a performance threshold is met. In some examples, the performance threshold may not be met where a time of deployment is too great, or management network 112 or data network 110 reaches a predetermined network congestion. For instance, the performance threshold may not be met where temporary deployment server 322, or BMC 332 of target server 322 more particularly, experiences too great a rate of input/output (I/O) transfers per second. In some examples, the performance threshold may not be met where there is too great a ratio of target servers to temporary deployment servers. These thresholds may be a function of the processing or compute specifications of a BMC and/or deployment servers and/or a function of network specifications of data network 110 and/or management network 112.

Where, at block 506, it is determined that the performance threshold is not met, master deployment server 102 may assign an additional target server as a temporary deployment server, as illustrated by a return to block 502. Master deployment server 102, may, for example, assign target server 324 as a temporary deployment server and may serve a command to target server 324 to receive image package 104 from target server 322 over data network 110.

At block 508, a location of a temporary deployment server and/or a trust certificate of a temporary deployment server may be served to a target server not assigned as a temporary deployment server. For instance, master deployment server 102 may issue trust certificates, and/or IP addresses of temporary deployment servers, e.g. temporary deployment servers 322-324 of first subset 320, to target servers 362-369 of second subset 360. Each trust certificate or IP address delivered to a target server of second subset 360 may correspond to a target server of first subset 320, such that a target server of second subset 360 may later retrieve image package 104 from a temporary deployment server that corresponds to the target server's received IP address and/or trust certificate.

The trust certificate may include any mechanism for ensuring a secure connection between a target server of second subset 360 and a temporary deployment server of first subset 320. For example, the trust certificate may take the form of an encryption key, and the master deployment server may serve the encryption key to any of temporary deployment servers 322-324 and target servers 362-369 such that a temporary deployment server with a matching encryption key (via symmetric or asymmetric encryption) of a target server may serve image package 104 to the target server. In some implementations, the trust certificate may take the form of an access code request, and the master deployment server may serve the access code to any of temporary deployment servers 322-324. A temporary deployment server able to provide the access code to a target server responsive to an access code request from the target server may serve the target server image package 104. Thus, master deployment server may ensure secure transfers between target servers by serving trust certificates to the target servers.

At block 510, master deployment server 102 may serve a command to any of target servers 362-369 to retrieve a deployment image of image package 104 from any of temporary deployment servers 322-324. In an example, any of target servers 362-369 may retrieve a deployment image of image package 104 from any of temporary deployment servers 322-324 over data network 110. The command may be served by master deployment server 102 over management network 112, which may be isolated from data network 110. The command may, for example, be served to any of target servers 362-369 through respective BMCs 372-379. Thus, a temporary deployment server may serve a deployment image to a target server through data network 110.

Figure 6:
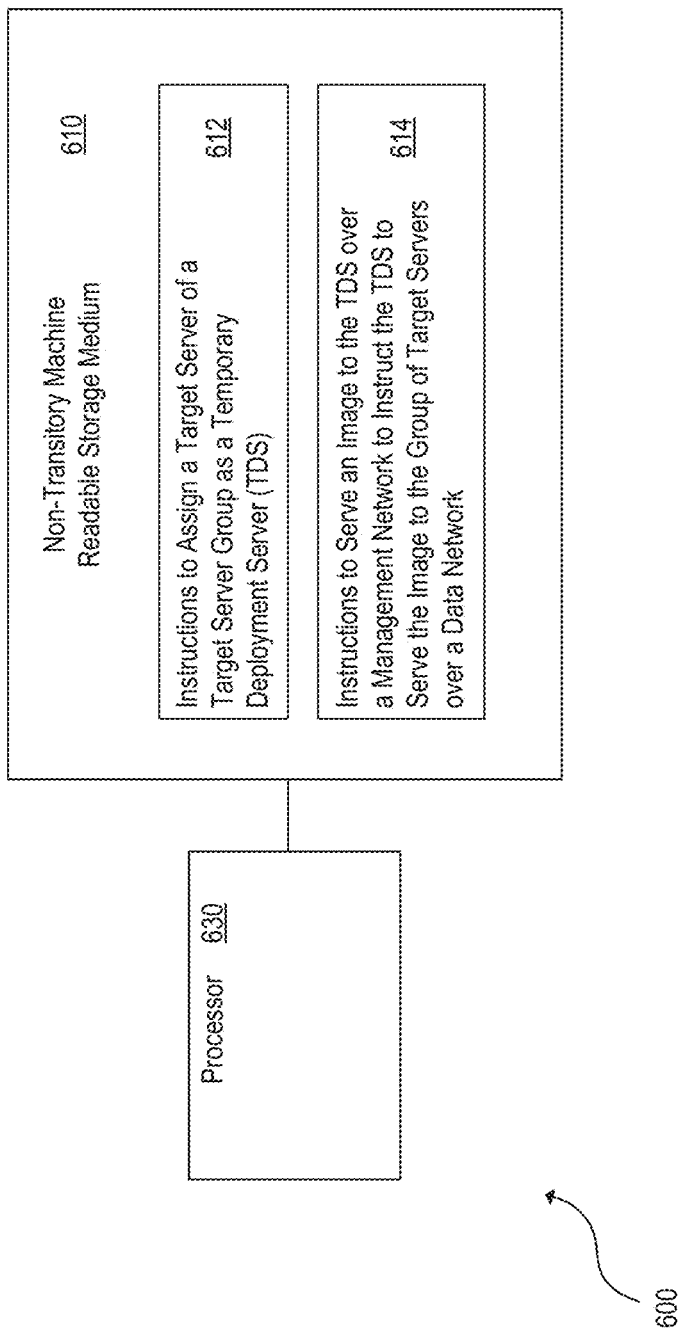
FIG. 6 is a block diagram of an example non-transitory machine-readable storage medium for serving a deployment image to a server group.
Figure 7:
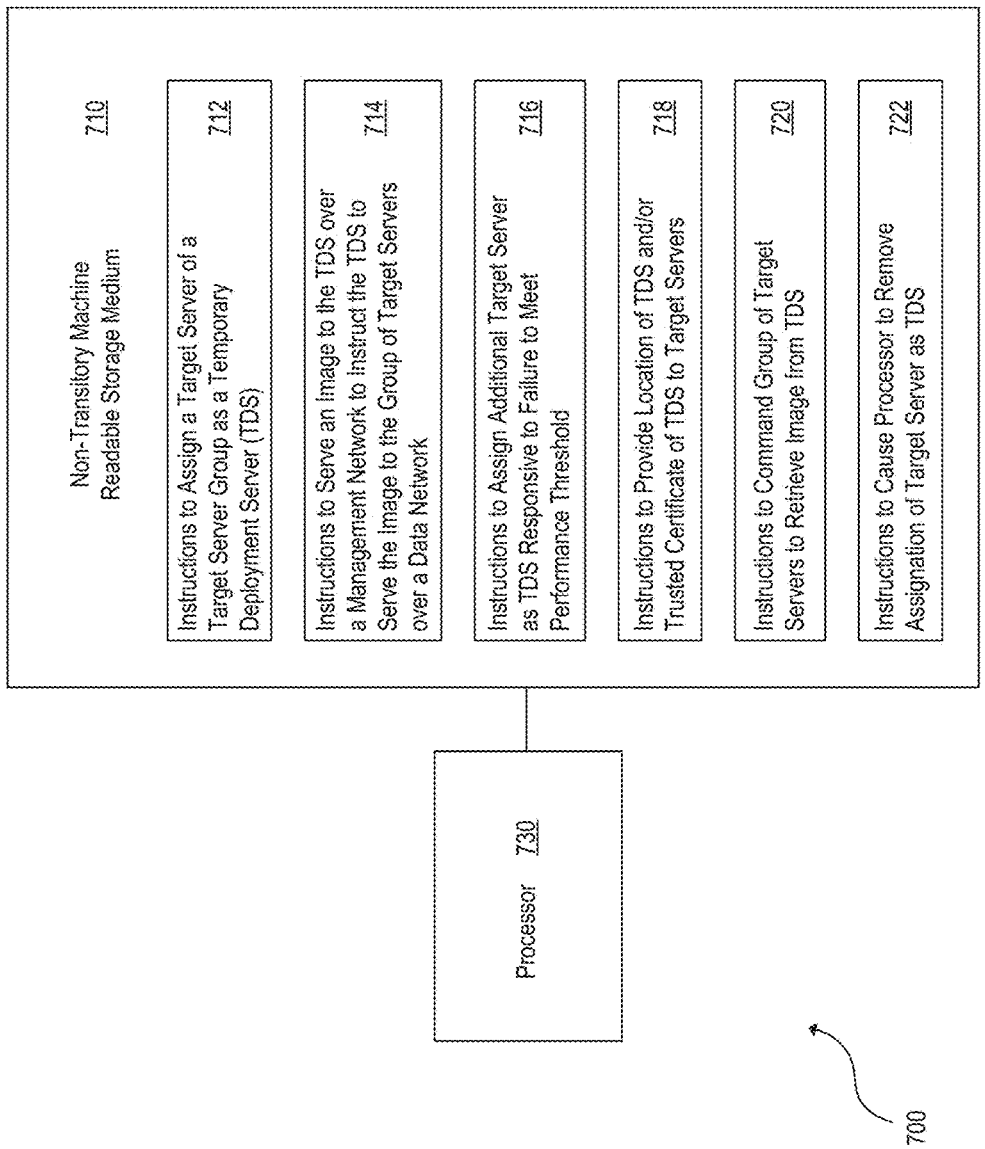
FIG. 7 is a block diagram of another example non-transitory machine-readable storage medium for serving a deployment image to a server group.

FIG. 6 and FIG. 7 are block diagrams of example non-transitory machine-readable mediums for serving a deployment image to a server group. Non-transitory machine-readable storage medium 610 of FIG. 6 may be coupled to a processor, e.g. processor 630, for deploying an image on a group of target servers. Similarly, non-transitory machine-readable storage medium 710 of FIG. 7 may be coupled to a processor, e.g. processor 730, for deploying an image on a group of target servers. Non-transitory machine-readable storage medium 610 and non-transitory machine-readable storage medium 710 may include executable instructions thereon. In the foregoing discussion, master deployment server 102 was described as combinations of hardware and software/firmware. Referring to FIG. 6, the software/firmware may be processor executable instructions 612-614 stored on a non-transitory machine-readable storage medium 610 and the hardware may include a processor 630 for executing those instructions. Referring to FIG. 7, the software/firmware may be processor executable instructions 712-722 stored on a non-transitory machine-readable storage medium 710 and the hardware may include a processor 730 for executing those instructions.

Non-transitory machine-readable storage medium 610 (or non-transitory machine-readable storage medium 710) may be implemented in a single device or distributed across devices. Likewise, processor 630 (or processor 730) may represent any number of physical processors capable of executing instructions stored by non-transitory machine-readable storage medium 610 (or non-transitory machine-readable storage medium 710). Further, non-transitory machine-readable storage medium 610 (or non-transitory machine-readable storage medium 710) may be fully or partially integrated in the same device as processor 630 (or processor 730), or it may be separate but accessible to that device.

In one example, the instructions may be part of an installation package that when installed can be executed by processor 610 (or processor 710) to serve OS images to deployment images to a server group. In this case, non-transitory machine-readable storage medium 610 (or non-transitory machine-readable storage medium 710) may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 610 (or non-transitory machine-readable storage medium 710) may include a hard disk, optical disk, tapes, solid state drives, RAM, ROM, EEPROM, or the like.

Processor 630 or 730 may be a central processing unit (CPU), graphics processing unit (GPU), microprocessor, and/or other hardware device suitable for retrieval and execution of instructions stored in non-transitory machine-readable storage medium 610 (or non-transitory computer readable storage medium 710). Processor 630 may fetch, decode, and execute program instructions 612-614, and/or other instructions. Similarly, processor 730 may fetch, decode, and execute program instructions 712-722. As an alternative or in addition to retrieving and executing instructions, processor 630 may include at least one electronic circuit comprising a number of electronic components for performing the functionality of instructions 612-614, and/or other instructions. Similarly, processor 730 may include at least one electronic circuit comprising a number of electronic components for performing the functionality of instructions 712-722, and/or other instructions.

Non-transitory machine-readable medium 610 may include instructions 612, that, when executed, may cause processor 630 to assign a target server of a group of target servers as a temporary deployment server. For example, as illustrated in FIG. 1, first target server 122 may be assigned as a temporary deployment server over management network 112 by master deployment server 102. The group of target servers, e.g. server group 150, may be in communication over data network 110 and may be a group of target servers on which a deployment image is to be deployed.

Non-transitory machine-readable storage medium 610 may also include executable instructions 614, that, when executed, may cause processor 630 to serve the image from a master deployment server over a management network to a temporary deployment server. For instance, image package 104, hosted by master deployment server 102 of FIG. 1, may be served over management network 112 to temporary deployment server 122. In some implementations, image package 104 may be served to temporary deployment server 122 through BMC 132 of temporary deployment server 122.

Turning to FIG. 7, non-transitory machine-readable storage medium 710 may include instructions 712, that, when executed, may cause processor 730 to assign a target server of a group of target servers as a temporary deployment server. For example, first target server 122 of FIG. 1 may be assigned as a temporary deployment server over management network 112 by master deployment server 102. The group of target servers, e.g. server group 150, may be in communication over data network 110 and may be a group of target servers on which a deployment image is to be deployed.

Non-transitory machine-readable storage medium 710 may also include executable instructions 714, that, when executed, may cause processor 730 to serve an image from a master deployment server over a management network to a temporary deployment server. For instance, image package 104, hosted by master deployment server 102 of FIG. 1 may be served over management network 112 to temporary deployment server 122. In some implementations, image package 104 may be served to temporary deployment server 122 through BMC 132 of temporary deployment server 122.

Non-transitory machine-readable storage medium 710 may also include executable instructions 716, that, when executed, may cause processor 730 to assign an additional target server as a temporary deployment server responsive to a failure to meet a performance threshold. For example, with reference to FIG. 3, master deployment server 102 may assign target server 322 as a temporary deployment server, and, where the performance threshold is not met, may additionally assign target server 324 as a temporary deployment server.

Non-transitory machine-readable storage medium 710 may include executable instructions 718, that, when executed, may cause processor 730 to provide a location of a temporary deployment server and/or a trust certificate of a temporary deployment server to a target server. The location of a temporary deployment server may be a physical location and/or an IP address of the temporary deployment server. Referring to FIG. 3, master deployment server 102 may issue trust certificates, and/or IP addresses of temporary deployment servers, e.g. temporary deployment servers 322-324 of first subset 320, to target servers 362-369 of second subset 360. Each trust certificate or IP address delivered to a target server of second subset 360 may correspond to a target server of first subset 320, such that a target server of second subset 360 may later retrieve image package 104 from a temporary deployment server that corresponds to the target server's received IP address and/or trust certificate.

Non-transitory machine-readable storage medium 710 may include executable instructions 720, that, when executed, may cause processor 730 to command the group of target servers to retrieve the image from a temporary deployment server. Referring to FIG. 3, master deployment server 102 may transmit a command to any of target servers 362-369 of second subset 360 to retrieve a deployment image of image package 104 from temporary deployment server 322 or temporary deployment server 324. Responsive to a target server having retrieved the deployment image of image package 104 from temporary deployment server 322 or temporary deployment server 324, master deployment server 102 may transmit a command to the target server that retrieved the deployment image to boot the retrieved image. In other implementations, deployment image of image package 104 may be automatically booted on the target server that retrieved the deployment image responsive to the deployment image being retrieved.

Non-transitory machine-readable storage medium 710 may include executable instructions 722, that, when executed, may cause processor 730 to remove the assignment of a target server as a temporary deployment server responsive to the group of target servers having retrieved the deployment image. Referring to FIG. 3, processor 730 may, for example, execute instructions to cause master deployment server 102 to remove the assignment of a target server as a temporary deployment server. In some examples, master deployment server 102 may monitor target servers 362-369 through management network 112. Responsive to target servers 362-369 having retrieved the deployment image, master deployment server 102 may remove the assignment of target server 322 or target server 324 as a temporary deployment server.

As another example, master deployment server 102 may monitor target server 322 or target server 324 through management network 112. Responsive to target server 322 or target server 324 deploying an image package 104 to a threshold number of target servers or a threshold percentage of target servers, master deployment server 102 may remove the assignment of target server 322 or target server 324 as a temporary deployment server. In some examples, the removal of an assignment as a temporary deployment server from a target server may cause image package 104 to boot on the target server. Thus, image package 104 may be served and booted on the target servers of server group 350.

Figure 8:
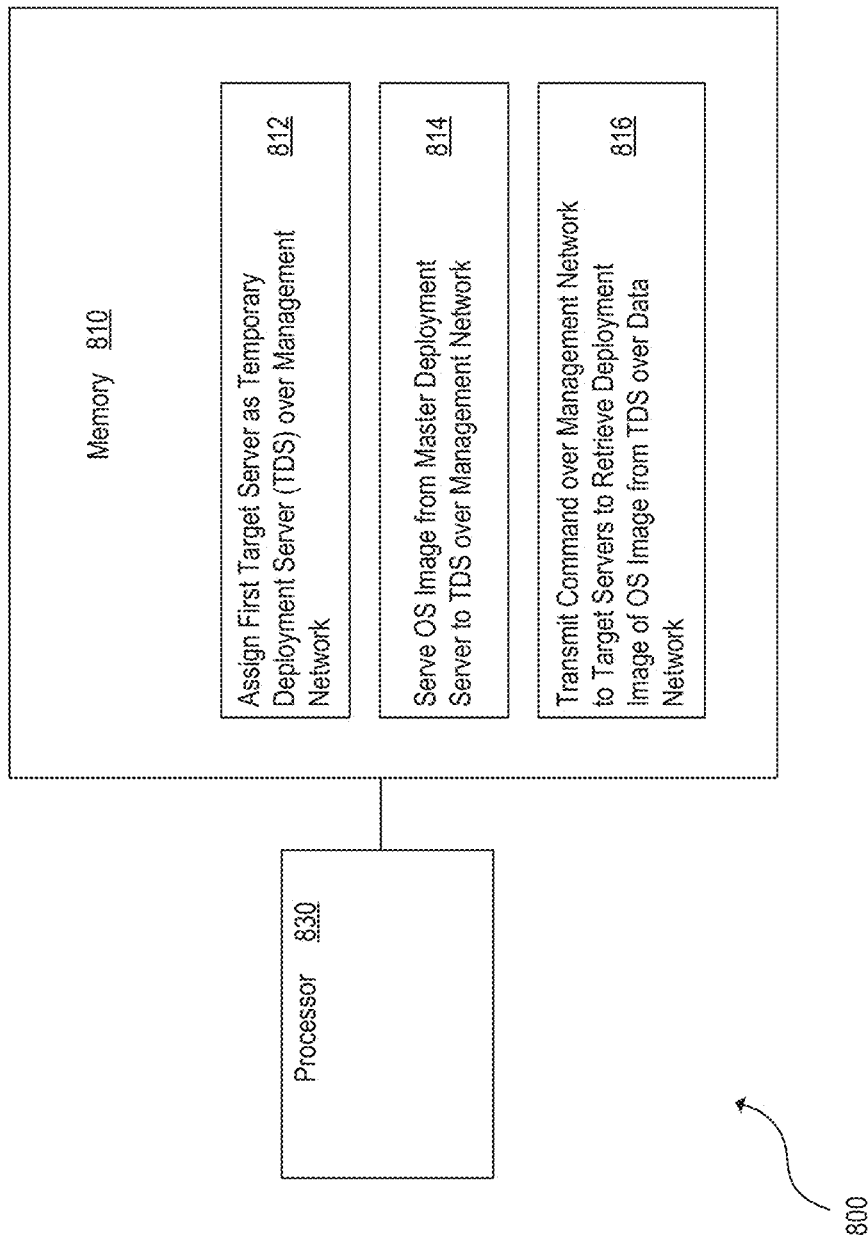
FIG. 8 is a block diagram of an example system for serving a deployment image to a server group.

FIG. 8 is a block diagram of another example system 800 for serving a deployment image to a server group. FIG. 8 may include physical processor 830 and memory 810. Memory 810 may include machine readable instructions to be executed by processor 830. Specifically, memory 810 may include instructions 812, that, when executed by processor 830, cause a master deployment server, e.g. master deployment server 102 of FIG. 1, to assign a target server of a group of target servers as a temporary deployment server. The target server may be assigned over a management network, e.g. management network 112 of FIG. 1. Memory 810 may also include instructions 814 to serve an operating system (OS) image from the master deployment server to the temporary deployment server. The OS image may be served to the temporary deployment server over the management network.

Memory 810 may further include instructions 816, that, when executed by processor 830, cause the master deployment server to transmit a command to target servers, i.e. target servers not assigned as a temporary deployment server, to retrieve a deployment image of the image package from the temporary deployment server. The deployment image may be booted on the target servers responsive to the target servers having retrieved the deployment image.

Figure 9:
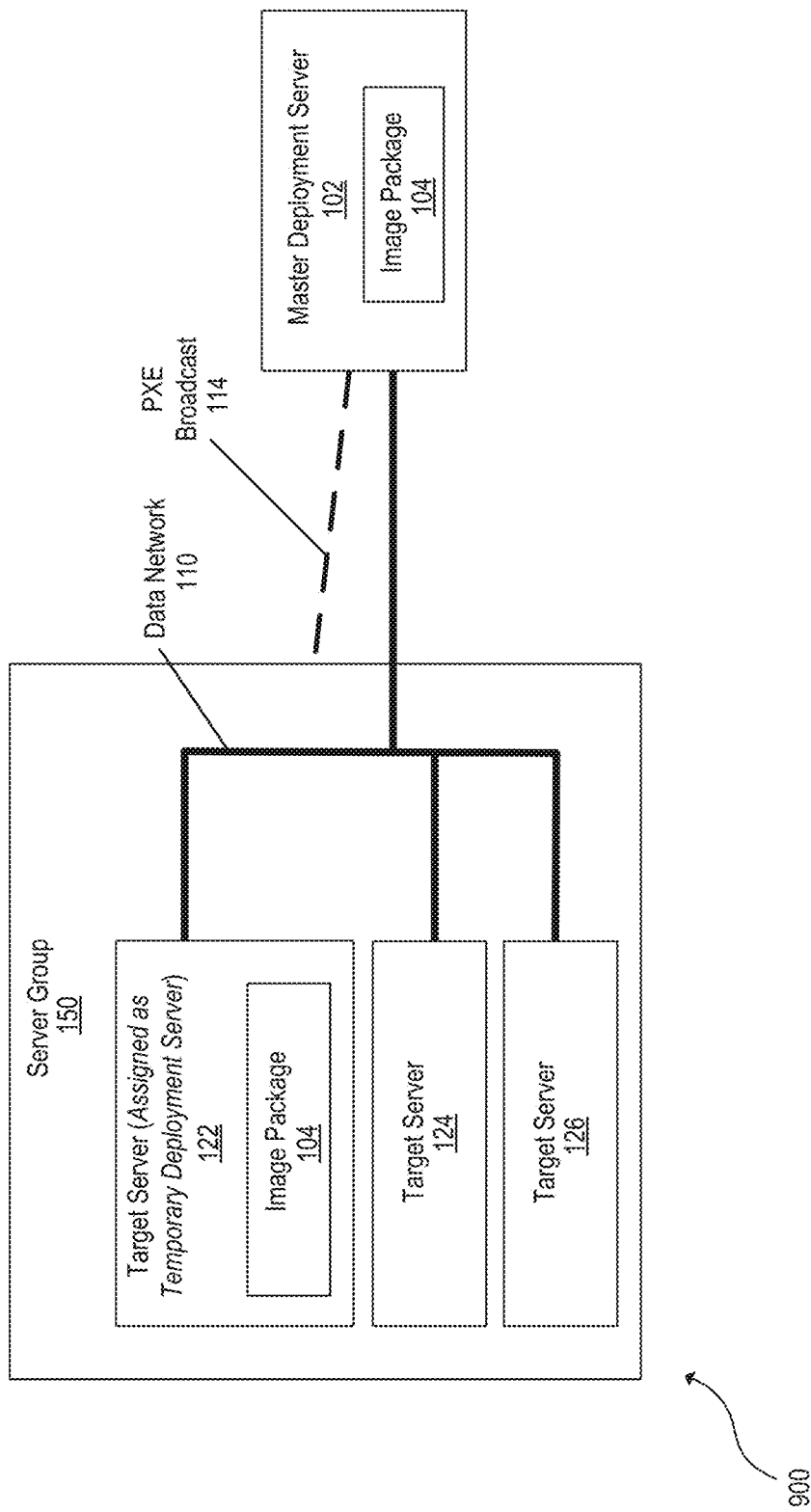
FIG. 9 is a block diagram of an example system for serving a deployment image to a server group through a dynamic host configuration protocol (DHCP) deployment.

FIG. 9 is a block diagram of an example system 900 for serving an operating system (OS) image such as a deployment image to a server group through a dynamic host configuration protocol (DHCP) deployment. System 900 may include similar architecture to that of system 100. For clarity and conciseness, some of the components of system 900 may be described with reference to system 100 of FIG. 1, including master deployment server 102 hosting image package 104, data network 110, server group 150 including target server 122 having BMC 132, target server 124 having BMC 134, and target server 126 having BMC 136.

Deploying an OS image through a network may be achieved through a dynamic host configuration protocol (DHCP) deployment. DHCP is a standardized networking protocol for automating requests for information such as Internet Protocol (IP) addresses and/or networking parameters. Under DHCP deployment, a server may transmit a broadcast upon booting. A DHCP server may respond to a broadcast by serving the broadcasting server an IP address and/or a deployment image.

However, deploying an OS image via DHCP deployment may increase the security vulnerability of the network. Unauthorized users may, for example, implement hardware to impersonate a DHCP deployment server. The impersonating DHCP deployment server may serve harmful or otherwise unauthorized data such as malware to a broadcasting server. The security of a network utilizing DHCP deployment may be enhanced by limiting server broadcasts to a predefined logical network. For example, servers may be accessed by a local area network (LAN) when broadcasting. Once served by the DHCP deployment server, a server may thereafter by granted access to a larger network, such as a wide area network (WAN).

In this example, target server 122, responsive to powering on or responsive to a transmission command, may transmit a Preboot eXecution Environment (PXE) broadcast 114. The broadcast may include a packet requesting a particular network configuration and booting parameters. Master deployment server 102, acting as a DHCP client, may assign target server 122 an IP address over the data network, and may further assign target server 122 as a temporary deployment server.

Master deployment server may also serve target server 122 image package 104 responsive to assigning target server 122 as the temporary deployment server. In an example, target server 122 is assigned as a temporary deployment server when served image package 104. For example, target server 122 may boot a bootstrap image of image package 104 which may cause target server 122 to serve a deployment image of image package 104 to target server 124 and/or target server 126 via data network 110. Thus, a temporary deployment server may be utilized to serve an image to target servers of a server group.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A master deployment server comprising:
   a physical processor;
   a memory storing machine readable instructions that, when executed by the physical processor, cause the processor to:
   assign, over a management network, a first target server from a group of target servers as a temporary deployment server;
   serve an image package from the master deployment server to the temporary deployment server over the management network; and
   transmit a command over the management network to a subgroup of the group of target servers to retrieve, over a data network, an image of the image package from the temporary deployment server.

2. The master deployment server of claim 1, wherein the management network comprises a low-performance special purpose network.

3. The master deployment server of claim 1, wherein the management network is isolated from the data network.

4. The master deployment server of claim 1, wherein the image package is served to the temporary deployment server through a baseboard management controller (BMC) of the temporary deployment server.

5. The master deployment server of claim 1, wherein the image package includes a deployment image to be booted on a target server on which it is deployed, and a bootstrap image to serve the deployment image.

6. The master deployment server of claim 1, wherein the machine readable instructions, when executed by the physical processor, cause the physical processor to transmit a command over the management network to boot the image retrieved by the subgroup of target servers on the subgroup of target servers.

7. The master deployment server of claim 1, wherein the memory further comprises machine readable instructions that, when executed by the physical processor, cause the master deployment server to transmit trusted certificates over the management network to the subgroup of target servers, the trusted certificates to facilitate a secure connection between the temporary deployment server and the subgroup of target servers.

8. The master deployment server of claim 1, wherein the memory further comprising machine readable instruction that, when executed by the physical processor, cause the physical processor to transmit a command to the temporary deployment server to serve the image to a second target server responsive to the second target server transmitting a Preboot eXecution Environment (PXE) broadcast.

9. A method comprising:
assigning, by a master deployment server over a management network, a first target server as a first temporary deployment server, wherein the first target server is of a group of target servers on which a deployment image is to be deployed;
serving, by the master deployment server over the management network to the first target server, an image package including a deployment image to be booted on a second target server of the group of target servers and a bootstrap image to serve the deployment image to the second target server; and
serving, by the master deployment server over the management network, a command to the second target server to retrieve the deployment image from a temporary deployment server, the deployment image to be received by the second target server over a data network isolated from the management network.

10. The method of claim 9, wherein the image package is served by the master deployment server to a baseboard management controller (BMC) of the first target server.

11. The method of claim 9, further comprising:
responsive to a failure to meet a performance threshold, assigning, by the master deployment server over a management network, a third target server of the group of target servers on which the deployment image is to be deployed as a second temporary deployment server; and
serving, by the master deployment server over the management network to the third target server, the image package.

12. The method of claim 9, further comprising serving, by the master deployment server to the second target server, a location of the first target server or a trust certificate of the first target server.

13. The method of claim 9, wherein the management network comprises a low-performance special purpose network.

14. A non-transitory machine-readable storage medium comprising instructions executable by a processor for deploying an image on a group of target servers, the machine-readable storage medium comprising:
instructions to cause the processor to assign, by a master deployment server over a management network, a first target server of the group of target servers as a first temporary deployment server;
instructions to cause the processor to serve the image from the master deployment server over the management network to the first temporary deployment server, wherein the group of target servers are tied to a data network isolated from the management network; and
instructions to cause the first temporary deployment server to serve the image to the group of target servers over the data network.

15. The non-transitory machine-readable storage medium of claim 14, further comprising instructions to cause the processor to command the group of target servers to retrieve the image from the first temporary deployment server.

16. The non-transitory machine-readable storage medium of claim 14, further comprising instructions to cause the processor to provide information to a target server of the target servers, the information including a location of the temporary deployment server, or a trusted certificate of the first temporary deployment server.

17. The non-transitory machine-readable storage medium of claim 14, further comprising instructions to cause the processor to remove, by the master deployment server over the management network, the assignment of the first target server as a first temporary deployment server, responsive to the group of target servers having retrieved the image.

18. The non-transitory machine-readable storage medium of claim 14, further comprising instructions to cause the processor to command a target server to boot the image as a deployment image.

19. The non-transitory machine-readable storage medium of claim 14, further comprising instructions to cause the processor to command a temporary deployment server to boot the image as a bootstrap image to serve the image to a target server.

20. The non-transitory machine-readable storage medium of claim 14, further comprising instructions to cause the processor to, responsive to a failure to meet a performance threshold, assign, by the master deployment server, a second target server of the group of target servers as a second temporary deployment server.

* * * * *